(12) United States Patent
Arbuckle et al.

(10) Patent No.: US 12,461,328 B2
(45) Date of Patent: Nov. 4, 2025

(54) OPTICAL FIBRE CLIP

(71) Applicant: LINIAN LAB LIMITED, Glasgow (GB)

(72) Inventors: Wesley Arbuckle, Glasgow (GB); Ian Arbuckle, Glasgow (GB)

(73) Assignee: LINIAN LAB LIMITED, Glasgow (GB)

( * ) Notice: Subject to any disclaimer, the term of this patent is extended or adjusted under 35 U.S.C. 154(b) by 316 days.

(21) Appl. No.: 18/033,399

(22) PCT Filed: Oct. 26, 2021

(86) PCT No.: PCT/GB2021/052779
§ 371 (c)(1),
(2) Date: Apr. 24, 2023

(87) PCT Pub. No.: WO2022/090704
PCT Pub. Date: May 5, 2022

(65) Prior Publication Data
US 2023/0400659 A1  Dec. 14, 2023

(30) Foreign Application Priority Data
Oct. 26, 2020 (GB) ..................... 2016972

(51) Int. Cl.
G02B 6/46 (2006.01)
(52) U.S. Cl.
CPC ..................... *G02B 6/47* (2023.05)
(58) Field of Classification Search
CPC ...... G02B 6/47; F16B 15/0015; F16B 5/0685; F16B 13/04; F16B 2/243; H02G 3/30
See application file for complete search history.

(56) References Cited

U.S. PATENT DOCUMENTS 3,583,663 A * 6/1971 Snow, Jr. ............... F16L 3/04
411/457
3,633,250 A * 1/1972 Romney ............... A47F 7/163
403/233
(Continued)

FOREIGN PATENT DOCUMENTS

FR  2263409 A1  10/1975
WO  WO 2020/070072 A1  4/2020

OTHER PUBLICATIONS

International Search Report and Written Opinion for PCT/GB2021/052779 dated Jan. 25, 2022.

*Primary Examiner* — Andrew Jordan
(74) *Attorney, Agent, or Firm* — MOSER TABOADA

(57) ABSTRACT

Herein is described a fixing of unitary construction for securing an article to a surface, comprising; a coupling arrangement (104), for coupling the article to the fixing, wherein the fixing comprises barbs (114) which increase the friction between the fixing and the hole; and an elongate member (106) extending from the coupling arrangement; the elongate member comprising a bend (108) which is located substantially midway along the length of the elongate member, the bend defining a first portion (110) and second portion (112) of the elongate member; wherein the first and second portions are resiliently biased away from each other, and the first portion extends between the coupling arrangement and the bend, and the second portion extends towards the coupling arrangement from the bend, forming a gap suitable for the article, between the second portion and the coupling arrangement; wherein the gap size is adjusted by varying the distance between the first and second portions of the elongate member.

16 Claims, 2 Drawing Sheets

(56) References Cited

U.S. PATENT DOCUMENTS

| | | | | |
|---|---|---|---|---|
| 3,673,643 | A * | 7/1972 | Kindell | F16B 5/125 |
| | | | | 49/492.1 |
| 3,737,128 | A * | 6/1973 | Schuplin | F16B 19/004 |
| | | | | 411/510 |
| 4,244,542 | A * | 1/1981 | Mathews | F16L 3/223 |
| | | | | 248/68.1 |
| 4,260,122 | A * | 4/1981 | Fiala | F16B 13/00 |
| | | | | 411/61 |
| 4,294,156 | A * | 10/1981 | McSherry | F16B 13/0808 |
| | | | | 411/908 |
| 4,406,557 | A * | 9/1983 | Suzuki | F16B 2/22 |
| | | | | 403/187 |
| 4,588,152 | A * | 5/1986 | Ruehl | F16B 13/02 |
| | | | | 411/475 |
| 4,795,856 | A * | 1/1989 | Farmer | F16L 3/223 |
| | | | | 174/40 R |
| 5,178,479 | A * | 1/1993 | Brown | F16B 21/088 |
| | | | | 248/74.2 |
| 5,845,883 | A * | 12/1998 | Meyer | F16L 3/127 |
| | | | | 248/222.12 |
| 5,906,346 | A * | 5/1999 | Lin | F16B 5/02 |
| | | | | 248/225.11 |
| 6,161,804 | A * | 12/2000 | Paske | H02G 3/32 |
| | | | | 248/74.1 |
| 6,276,644 | B1 * | 8/2001 | Jennings | F16L 3/04 |
| | | | | 248/65 |
| 6,296,430 | B1 * | 10/2001 | Fischer | H02G 3/26 |
| | | | | 411/33 |
| 6,580,867 | B2 * | 6/2003 | Galaj | G02B 6/4459 |
| | | | | 248/65 |
| 6,742,760 | B2 * | 6/2004 | Blickhan | F16K 7/06 |
| | | | | 251/11 |
| 6,896,461 | B2 * | 5/2005 | Fleydervish | F16B 37/02 |
| | | | | 411/60.2 |
| 6,899,305 | B2 * | 5/2005 | Korczak | F16L 3/12 |
| | | | | 248/68.1 |
| 6,899,501 | B2 * | 5/2005 | LoGiudice | F16B 15/0015 |
| | | | | 40/607.1 |
| 7,090,174 | B2 * | 8/2006 | Korczak | F16B 37/045 |
| | | | | 248/65 |
| 7,097,142 | B1 * | 8/2006 | Schmidt | H02G 3/30 |
| | | | | 248/68.1 |
| 7,326,855 | B2 * | 2/2008 | Moffatt | H02G 3/30 |
| | | | | 248/68.1 |
| 8,011,621 | B2 * | 9/2011 | Korczak | H02G 3/30 |
| | | | | 248/62 |
| 8,020,259 | B2 * | 9/2011 | Ho | F16L 3/222 |
| | | | | 24/339 |
| 8,191,836 | B2 * | 6/2012 | Korczak | F16L 3/127 |
| | | | | 248/62 |
| 8,353,485 | B2 * | 1/2013 | Hjerpe | F16L 3/222 |
| | | | | 248/74.1 |
| 8,496,420 | B2 * | 7/2013 | Aoki | F16B 21/075 |
| | | | | 411/553 |
| 8,721,245 | B2 * | 5/2014 | Kanai | F16B 15/0015 |
| | | | | 411/921 |
| 8,727,288 | B2 * | 5/2014 | Ruiz | F16L 3/00 |
| | | | | 248/65 |
| 8,879,881 | B2 * | 11/2014 | Cote | G02B 6/44524 |
| | | | | 211/163 |
| 9,127,789 | B2 * | 9/2015 | Caspari | H02G 3/30 |
| 9,316,029 | B2 * | 4/2016 | Hunt | F16B 2/22 |
| 9,488,208 | B2 * | 11/2016 | Hemingway | F16B 37/04 |
| 9,581,782 | B2 * | 2/2017 | Abby | B65H 75/446 |
| 9,618,024 | B2 * | 4/2017 | Arashi | B60N 2/72 |
| 9,671,046 | B2 * | 6/2017 | Whipple | F16L 3/233 |
| 9,759,880 | B2 * | 9/2017 | Chamberlain | H04W 88/08 |
| 9,800,028 | B1 * | 10/2017 | Smith | H02G 3/0443 |
| 9,853,434 | B2 * | 12/2017 | Vaccaro | F16B 21/086 |
| 9,866,004 | B2 * | 1/2018 | Vaccaro | G09F 15/0037 |
| 9,903,510 | B2 * | 2/2018 | Joshi | F16B 45/005 |
| 9,977,214 | B2 * | 5/2018 | Vaccaro | F16L 3/137 |
| 9,983,378 | B2 * | 5/2018 | Vaccaro | H02G 3/32 |
| 9,995,414 | B2 * | 6/2018 | Joshi | F16B 15/00 |
| 10,047,775 | B2 * | 8/2018 | Bruckbauer | H02G 3/32 |
| 10,158,218 | B2 * | 12/2018 | Vaccaro | H02G 3/32 |
| 10,215,945 | B2 * | 2/2019 | Vaccaro | H02G 3/32 |
| 10,243,339 | B2 * | 3/2019 | Vaccaro | F16B 1/00 |
| 10,294,675 | B2 * | 5/2019 | Langeveld | E04F 13/083 |
| 10,336,265 | B2 * | 7/2019 | Dickinson | F16B 2/243 |
| 10,393,985 | B2 * | 8/2019 | Vaccaro | H02G 3/32 |
| 10,517,410 | B2 * | 12/2019 | Williams | A47F 5/0031 |
| 10,597,120 | B2 * | 3/2020 | Oakes | F16B 5/0685 |
| 10,627,584 | B2 * | 4/2020 | Zhong | G02B 6/3879 |
| 10,837,577 | B2 * | 11/2020 | Arbuckle | F16B 5/0685 |
| 10,865,823 | B2 * | 12/2020 | Garfield | F16B 13/0808 |
| 10,871,180 | B2 * | 12/2020 | McDuff | F16B 13/04 |
| 10,894,516 | B2 * | 1/2021 | Benedetti | F16B 5/0657 |
| 10,935,105 | B2 * | 3/2021 | Bell | H02G 1/08 |
| 11,002,383 | B2 * | 5/2021 | Naugler | F16B 2/243 |
| 11,004,367 | B2 * | 5/2021 | Vaccaro | E01F 9/65 |
| 11,073,174 | B2 * | 7/2021 | Parker | F16B 15/0015 |
| 11,118,373 | B2 * | 9/2021 | Durham | E04H 17/1447 |
| 11,143,333 | B2 * | 10/2021 | Joshi | F16L 3/08 |
| 11,238,762 | B2 * | 2/2022 | Vaccaro | G09F 15/0018 |
| 11,396,958 | B2 * | 7/2022 | Vaccaro | F16L 3/13 |
| 11,420,571 | B1 * | 8/2022 | Spearing | F16B 37/02 |
| 11,536,398 | B2 * | 12/2022 | Vaccaro | F16L 3/223 |
| 11,551,589 | B2 * | 1/2023 | Vaccaro | G09F 15/0062 |
| 11,555,559 | B2 * | 1/2023 | Vaccaro | H02G 3/263 |
| 11,569,646 | B2 * | 1/2023 | Smith | H02G 3/30 |
| 11,608,912 | B2 * | 3/2023 | Arbuckle | H02G 3/32 |
| 11,703,149 | B2 * | 7/2023 | Vaccaro | F16L 3/13 |
| | | | | 248/68.1 |
| 11,732,839 | B2 * | 8/2023 | Atakan | F16B 2/22 |
| | | | | 248/229.16 |
| 11,746,522 | B2 * | 9/2023 | Sobel | F16B 9/05 |
| | | | | 52/653.1 |
| 11,746,815 | B2 * | 9/2023 | Koper | F16B 15/08 |
| | | | | 227/176.1 |
| 11,817,817 | B2 * | 11/2023 | Wedding | H02S 40/30 |
| 11,830,386 | B2 * | 11/2023 | Vaccaro | G09F 15/0062 |
| D1,007,284 | S * | 12/2023 | Martin | D8/367 |
| D1,007,285 | S * | 12/2023 | Martin | D8/367 |
| D1,007,286 | S * | 12/2023 | Martin | D8/367 |
| D1,008,004 | S * | 12/2023 | Roccapriore | D8/367 |
| D1,008,006 | S * | 12/2023 | Martin | D8/367 |
| D1,008,007 | S * | 12/2023 | Martin | D8/367 |
| D1,017,388 | S * | 3/2024 | Martin | D8/367 |
| 11,923,109 | B2 * | 3/2024 | Vaccaro | H01B 17/586 |
| 12,031,651 | B2 * | 7/2024 | Vaccaro | F16L 3/13 |
| 12,180,986 | B2 * | 12/2024 | Koper | F16B 15/06 |
| D1,061,228 | S * | 2/2025 | Baynard | H02G 3/32 |
| | | | | D8/370 |
| 12,224,085 | B2 * | 2/2025 | Vaccaro | H01B 17/586 |
| D1,067,761 | S * | 3/2025 | Baynard | D8/370 |
| 12,249,822 | B2 * | 3/2025 | Martin | H02G 7/053 |
| 12,260,783 | B2 * | 3/2025 | Vaccaro | G09F 15/0018 |
| 2002/0005463 | A1 * | 1/2002 | Paske | H02G 3/30 |
| | | | | 248/68.1 |
| 2002/0066833 | A1 * | 6/2002 | Ferrill | F16L 3/04 |
| | | | | 248/62 |
| 2003/0021655 | A1 * | 1/2003 | Correll | F24D 3/143 |
| | | | | 411/473 |
| 2004/0251386 | A1 * | 12/2004 | Mizukoshi | F16L 3/223 |
| | | | | 248/68.1 |
| 2005/0069398 | A1 * | 3/2005 | Arbuckle | F16L 3/127 |
| | | | | 411/34 |
| 2005/0087662 | A1 * | 4/2005 | Jacobs | F16L 3/14 |
| | | | | 248/303 |
| 2005/0109887 | A1 * | 5/2005 | Catapano | H02G 3/30 |
| | | | | 248/68.1 |
| 2005/0109890 | A1 * | 5/2005 | Korczak | H01P 1/00 |
| | | | | 248/74.1 |
| 2006/0249633 | A1 * | 11/2006 | Korczak | F16L 3/24 |
| | | | | 248/62 |
| 2008/0093510 | A1 * | 4/2008 | Oh | F16L 3/2235 |
| | | | | 248/63 |
| 2009/0101763 | A1 * | 4/2009 | Newcomb | H02G 3/30 |
| | | | | 248/58 |

(56) References Cited

U.S. PATENT DOCUMENTS

| | | | |
|---|---|---|---|
| 2009/0242715 A1* | 10/2009 | Kosidlo | F16B 2/243 280/728.2 |
| 2009/0294602 A1* | 12/2009 | Korczak | H02G 3/30 248/74.1 |
| 2011/0283515 A1* | 11/2011 | Korczak | H02G 3/30 29/446 |
| 2014/0017025 A1* | 1/2014 | Hemingway | H02G 3/32 411/15 |
| 2014/0054425 A1* | 2/2014 | Jang | F16L 3/00 248/49 |
| 2015/0101150 A1* | 4/2015 | Harvey | B65D 88/36 24/129 B |
| 2015/0155669 A1* | 6/2015 | Chamberlain | H01Q 1/246 439/507 |
| 2015/0330560 A1* | 11/2015 | Zhang | B25H 3/00 248/220.22 |
| 2016/0153587 A1* | 6/2016 | Smith | H02G 3/30 29/515 |
| 2016/0214520 A1* | 7/2016 | Kajio | F16B 2/243 |
| 2016/0281881 A1* | 9/2016 | Vaccaro | F16B 1/00 |
| 2016/0281883 A1* | 9/2016 | Vaccaro | H02G 3/32 |
| 2016/0375840 A1* | 12/2016 | Dickinson | F16B 5/065 24/295 |
| 2017/0113629 A1* | 4/2017 | Dickinson | B60R 13/0206 |
| 2017/0122460 A1* | 5/2017 | Joshi | F16L 3/1075 |
| 2017/0268459 A1* | 9/2017 | Alletto | F16B 2/20 |
| 2018/0034252 A1* | 2/2018 | Smith | H02G 3/04 |
| 2018/0163899 A1* | 6/2018 | Rajpal | F16L 3/2235 |
| 2018/0233888 A1* | 8/2018 | Smith | F16L 3/223 |
| 2019/0072212 A1* | 3/2019 | Arbuckle | F16B 5/0685 |
| 2021/0372541 A1* | 12/2021 | Arbuckle | F16L 3/127 |
| 2022/0038046 A1* | 2/2022 | Wedding | H02G 3/30 |
| 2022/0190577 A1* | 6/2022 | Worden | H02G 3/28 |
| 2023/0400659 A1* | 12/2023 | Arbuckle | G02B 6/47 |
| 2023/0420925 A1* | 12/2023 | Martin | H02G 3/32 |

* cited by examiner

OPTICAL FIBRE CLIP

FIELD OF THE INVENTION

The present invention relates to an apparatus and methods for securing articles onto a surface, such as a wall of a building. In particular, the invention relates to an apparatus and methods for securing cabling onto a wall with pre-prepared apertures such as pre-drilled holes.

BACKGROUND OF THE INVENTION

In order to attach articles such as cables to a wall or other surface, it is known to use a fixing such as a bracket or a saddle clip. Conventionally, said fixings are installed by drilling a suitably sized hole, inserting a deformable plug, and passing a screw through an aperture in the fixing and into the deformable plug. The screw causes the plug to deform or expand, which then exerts pressure against the walls of the hole, thereby retaining the fixing in place.

The process of attaching these types of fixings to walls can be time consuming as each fixing requires multiple steps to attach it to a wall. One approach to address this issue has been the use of fixings or clips which require neither a screw nor a plug to install.

Clips can be used which have opposed resiliently biased legs. The legs can be squeezed together to introduce the clip into a hole, and when released spring outwardly and engage with the walls of the hole. Barbs on the outside of the legs may provide additional engagement with the wall and increase the force required to remove the clip from the hole.

For fixing cables to a wall, prior art fixings require the user to insert the cable into the fixing first, before inserting or offering up the fixing into the pre-drilled hole. However, there remains a need for a fixing which can be partially inserted into a wall, which will allow a cable to be attached or placed inside the fixing, before it is fully inserting into the wall. This is desirable in various circumstances, for instance, when cables need to be temporarily laid out, before choosing their final positions on the wall.

Having the ability to partially insert the fixing into the wall allows the user to partially insert multiple fixings, and then route a cable through the multiple fixings in one pass. After the cable has been positioned correctly, the fixings can then all be fully inserted into the wall-thereby securing the cable to the wall. This process can save significant amounts of time, and results in a more efficient cable routing operation.

For the above reasons, there remains a need to address or mitigate at least one or more of the aforementioned problems.

Is an object of at least one aspect of the present invention to obviate or at least mitigate one or more of the aforementioned problems.

It is a further object of the present invention to provide improved apparatus and methods for securing cabling onto a wall.

SUMMARY OF THE INVENTION

According to an aspect of the present invention, there is provided a fixing of unitary construction for securing an article to a surface, comprising;
 a coupling arrangement, for coupling the article to the fixing; and
 an elongate member extending from the coupling arrangement;
 the elongate member comprising a bend which is located substantially midway along the length of the elongate member, the bend defining a first portion and second portion of the elongate member;
 wherein the first and second portions are resiliently biased away from each other, and the first portion extends between the coupling arrangement and the bend, and
 the second portion extends towards the coupling arrangement from the bend, forming a gap suitable for the article, between the second portion and the coupling arrangement;
 wherein the gap size is adjusted by varying the distance between the first and second portions of the elongate member; and
 wherein the fixing comprises barbs which increase the friction between the fixing and the hole.

According to another aspect of the present invention there is provided a fixing for securing an article to a surface, comprising;
 a coupling arrangement, for coupling and/or attaching the article to the fixing; and
 an elongate member extending from the coupling arrangement;
 the elongate member comprising a bend which is located substantially midway along the length of the elongate member, the bend defining a first portion and second portion of the elongate member;
 wherein the first and second portions are resiliently biased away from each other, and the first portion extends between the coupling arrangement and the bend, and
 the second portion extends towards the coupling arrangement from the bend, forming a gap suitable for the article, between the second portion and the coupling arrangement;
 wherein the gap size is adjusted by varying the distance between the first and second portions of the elongate member.

According to another aspect of the present invention there is provided a fixing for securing an article to a surface, comprising:
 a coupling arrangement, for coupling and/or attaching the article to the fixing; and
 an elongate member extending from the coupling arrangement;
 the elongate member comprising a bend which is located along the length of the elongate member, the bend defining at least a first portion and a second portion of the elongate member;
 wherein the first and second portions are biased away from each other, and the first portion extends between the coupling arrangement and the bend, and
 the second portion extends towards the coupling arrangement from the bend, forming a gap, between the second portion and the coupling arrangement.

The article may be a cable. The surface may be a wall. The cable may be a fibre optic cable. The cable may be around 2 mm-4 mm diameter. The cable may have a smaller diameter than 2 mm. The cable may have a larger diameter than 4 mm.

The fixing may be of a unitary construction.

The gap size may be adjusted by varying the distance between the first and second portions of the elongate member.

The first and second portions of the elongate member may generally diverge from each other as they extend from the bend. The level of divergence may vary depending on the size of the fixing, or the application where the fixing is to be used. The level of divergence may be about 5-80°, about 10-45° or about 20-30°.

In use, the fixing may be fully or partially inserted into a hole, in for example a wall, thereby reducing the distance between the first and second portions of the elongate member, thus reducing the gap size and thus coupling the article to the fixing. When the fixing is partially inserted into the hole, the article may be freely removed and re-inserted into the coupling arrangement. This may allow the installer to 'test fit' the article in different locations. For example, if the article is a cable, then the path of the cable route can be tested in various different configurations. This allows for far greater flexibility of use, over the systems known in the art.

The fixing may be a single unitary elongate member. Alternatively, the fixing may be constructed/made from a plurality of elongate members. The fixing may be formed from a pressed material and/or alloy. The material may be steel. The material may also be made from or comprise any suitable type of plastics and/or composite material.

The coupling arrangement may partially encircle the article. The coupling arrangement may substantially fully, or fully, encircle the article when the fixing is fully inserted into a hole.

The fixing may comprise barbs and/or anchors (i.e. protruding members) which increase the friction between the fixing and the hole. The barbs and/or anchors (i.e. protruding members) may be of any shape or form. The barbs and/or anchors (i.e. protruding members) may be located anywhere on the fixing such as on the first and/or second portion.

The barbs and/or anchors may be any suitable shape to increase the friction between the fixing and the wall. The barbs may usually be directed towards the outside of the hole, which results in them being easily inserted, but makes them difficult to release. The angled barbs may also be useful for aligning the fixing within the hole. If the fixings are used to secure fire cables, there is a requirement that they must be firmly fixed to the wall, and the barbs help to achieve this.

The second portion of the elongate member may comprise a kink (e.g. bend and/or deformation), which causes a length of the second portion to diverge away from the first portion. The kink (e.g. bend and/or deformation) may be in any location on the elongate member. The angle of divergence may range from about 5-80°, about 10-45° or about 20-30°

The fixing may be suitable for inserting into a hole which has a diameter of about 1 mm-10 mm or about 2 mm-4 mm. The hole may be drilled before inserting the fixing. Different sized fixings may require different diameter holes.

The coupling arrangement may be releasably engageable with the second portion of the elongate member. When the fixing is fully inserted into the hole, the second portion of the elongate member will have moved towards the coupling arrangement, wherein on contact, the two components may fasten together. This fastening may be done via a clip, fastener, clasp, catch, pin, hook, loop, or coupler. Any suitable features may be used to join the components together. This effectively constrains the article within the coupling arrangement, as the second portion of the elongate member provides a resilient biasing force on the article.

The coupling arrangement may also be fixedly engageable with the second portion of the elongate member. This may be required when the user desires an extra secure fitting.

According to another aspect of the present invention, there is provided a method of fixing an article to a surface, the method comprising the steps of:

creating a hole or aperture in the surface;
partially inserting a fixing according to any of the previous aspects into the hole;
inserting the article through a gap, and into or adjacent the coupling arrangement;
inserting the fixing into the hole, thereby causing the first and second portions of the elongate member to move towards one another, thus reducing the distance between the first and second portions, thus reducing the gap size, thereby securely coupling the article to the fixing, and attaching the fixing to the surface.

The fixing may be fully or substantially fully inserted into the hole thereby causing the first and second portions of the elongate member to move towards one another.

The clamping force on the article within the coupling arrangement may be proportional to how far the fixing is inserted into the hole.

The further the fixing is inserted into the hole, the greater the friction force between the fixing and the hole, and the greater the clamping force on the article. From one movement by the user, the fixing is securely fixed into the hole, and the article is securely attached to the fixing.

The fixing may be inserted into the hole orientated with the bend entering the hole first.

The article may be a cable.

According to another aspect of the invention, there is provided a kit of parts, comprising any of the fixings as previously described, in combination with an insertion device, which is suitable for inserting the fixing into a hole.

The insertion device may comprise a handle. The insertion device may comprise a recess, to engage with the fixing. The insertion device may be generally shaped as shown in the figures. The insertion device may be made of any suitable material. The insertion device may reduce fatigue experienced by the installer of the fixings.

The fixing may be a secure, single-components design. The fixing may not comprise any plastic, and therefore have a melting temperature of over 1200 degrees Celsius.

The fixing may not require any plugs, screws or washers. The fixing may be corrosion resistant, and UV stable.

The fixing may be suitable for indoor and outdoor use.

Further optional features disclosed in relation to each aspect of the invention correspond to further optional features of each other aspect of the invention.

BRIEF DESCRIPTION OF THE DRAWINGS

Non-limiting example embodiments the present invention will now be described with reference to the accompanying drawings in which:

FIG. 5 is an elevation view, and FIG. 6 is a perspective view.

DETAILED DESCRIPTION

Figure 1:
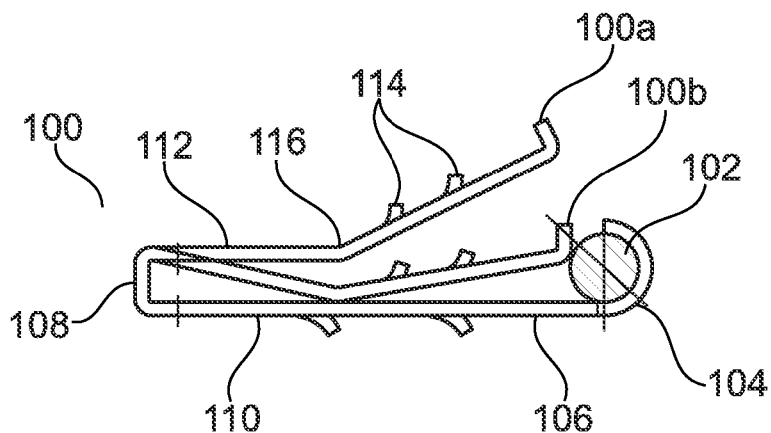
FIG. 1 is an embodiment of the present invention, showing a side elevation of the fixing in both its open and closed configurations.

FIG. 1 shows an embodiment of the present invention, showing a side elevation of the fixing 100 in both its open 100a and closed 100b configurations. An example of an article 102 can be seen, located inside the coupling arrangement 104. The elongate member 106 can be seen to extend from the coupling arrangement 104. The elongate member 106 comprises a bend 108, which separates the elongate member into a first portion 110 and a second portion 112. The first portion 110 and second portions 112 are resiliently biased away from each other, due to the spring force created by the geometry of the bend 108.

The first portion 110 extends between the coupling arrangement 104 and the bend 108, whereas the second portion 112 extends towards the coupling arrangement from the bend 108, forming a gap suitable for the article 104. The gap is located between the second portion 112 of the elongate member and the coupling arrangement 104. The gap size can be adjusted by varying the distance between the first portion 110 and the second portion 112 of the elongate member. For example, moving the fixing into its closed configuration 100b, will result in a smaller gap size than when the fixing 100 is in the open configuration 100a.

The gap size will therefore depend on how far the fixing 100 is inserted into its hole. The gap size adjustments may be dictated on the shape of the fixing 100 and the elongate members.

For example, the article 102 may be a cable (electrical or fibre optic etc.), and the surface may be a wall.

The first portion 110 and second portion 112 of the elongate member may diverge from each other as they extend from the bend 108. This divergence can be seen in FIG. 1, as the two portions are not aligned parallel with one another but form a general wedge shape. This wedge shape assists in gripping the fixing 100 to the inside of the hole in which it is inserted. The wedge shape assists in inserting the fixing 100, and also provides a greater grip when the fixing 100 is inserted into the hole. As the fixing 100 is pulled, the wedge shape will tend to tighten against the hole, thereby increasing the friction on the wall.

The wedge shape has the combined benefit of allowing easy insertion of the fixing 100 into the wall, whilst also providing excellent grip capabilities.

In use, the fixing 100 as shown in FIG. 1 would be partially inserted into a hole, which had been pre-drilled into a surface such as a wall. The fixing 100 is partially inserted, such that the fixing 100 remains in the open configuration 100a, to allow an article 102 to be inserted through the gap. Once the article 102 has been inserted through the gap, and placed inside the coupling arrangement 104, the fixing 100 is then fully inserted into the hole, by simply pressing the fixing 100 via the coupling arrangement 104 into the hole. As the fixing 100 moves further into the hole, the second portion 112 of the elongate member 106 is forced towards the first portion 110 of the elongate member 106, by virtue of the geometry restriction of the hole. This has two simultaneous functions:

1) as the first portion 110 and the second portion 112 are resiliently biased away from one another, the further the fixing 100 is inserted into the hole, the greater the spring force is generated which is keeping them apart. This in turn means that there is a higher friction force, preventing the fixing 100 from moving out of the hole. This results in a very secure fixing 100, which is not easily removeable from the wall.

2) as the second portion 112 moves towards the first portion 110, the gap size is reduced, and a clamping force is exerted on the article 102 by the second portion 112, thus trapping the article 102 inside the coupling arrangement 104. This clamping force on the article 102 prevents the article 102 from sliding through the fixing 100, when the fixing is fully inserted into the wall.

A distinct advantage of the above technique is that the further the fixing 100 is inserted into the hole, the tighter the grip of the fixing 100 is on the hole, and the tighter the article 102 is held inside the coupling arrangement 104. This is all achieved by merely pushing the fixing 100 into the hole, with the use of one finger or thumb. If the article was a cable, and the cable required a large number of fixings, then this technique can be very efficient and time saving. The technique also allows for the cable to be loosely set out, with the fixings 100 partially inserted, to give the installer the option to remove the cable from the fixing 100 easily, without having to remove the fixing 100 from the wall.

For example, the installer may want to test fit the cable in an installation, following numerous different cable paths. This would have been very difficult if only using the fixings according to the prior art, as the cables cannot be easily removed from them, even when the fixings are only partially inserted. The fixings 100 according to the invention enable quick and easy changes to be made to the cable routing.

The coupling arrangement 104 in FIG. 1 is shown to be generally cylindrical in shape, with the embodiment in FIG. 1 showing a bend which describes a half-circular profile, to suit a cylindrical article 102. The coupling arrangement 104 can be seen to partly encircle the article 102. The coupling arrangement 104 may be shaped differently, to suit different profiles of article 102.

Figure 2:
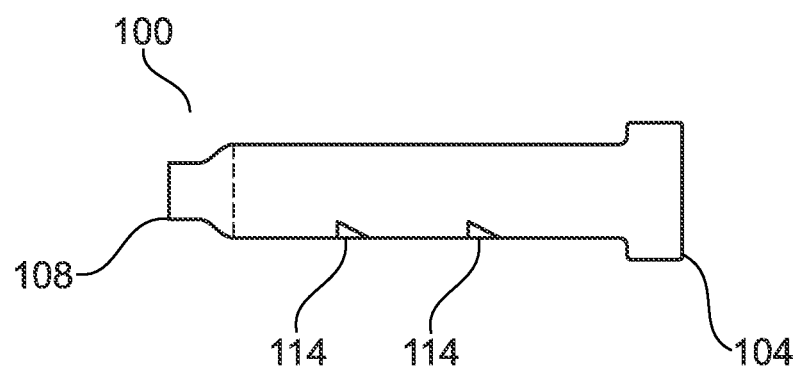
FIG. 2 is an embodiment of the present invention, showing a plan view of the fixing in FIG. 1.

FIGS. 1 and 2 also show barbs 114, which are designed to increase the friction of the fixing 100 inside the hole, to prevent the fixing 100 from easily exiting the hole. The barbs 114 will also act as guides if the inside of the hole is non-uniform (such is expected inside masonry for example). The barbs 114 may be pressed out of the sheet material when the fixing 100 is being manufactured. The barbs 114 may be cut out of the material of the fixing, before being bent. The barbs 114 may also be coated in a high friction material, to prevent the fixing 100 from being easily removed from the hole in the wall. The barbs 114 may be of a different form and orientation to those shown in the figures without departing from the invention.

A typical installation of the fixing 100 would be to first drill a hole, for example a 3 mm diameter hole with a depth of 16 mm. The cable can then be inserted into the fixing 100. The fixing 100 and cable are then inserted into the wall together, resulting in a fixing 100 which is attached to the wall, and a cable which is attached to the fixing 100.

The barbs 114 may be of any shape which provides increased grip and or friction between the fixing 100 and the wall, thereby preventing the fixing 100 from inadvertently coming out of the wall. The barbs 114 also act as a self-alignment aid to the fixing 100, allowing the fixing 100 to proper orientate itself within the hole.

The fixing 100 may be manufactured by pressing the fixing 100 out of a sheet material, such as sheet metal. The fixing may then be formed by the process of bending the fixing 100 in certain locations, to create the finished product. This process results in a product which is easy to manufacture.

FIG. 1 also shows that the second portion 112 comprises a kink 116. This kink 116 projects the distal end of the second portion 112 in a divergent manner from the proximal end of the second portion 112. This has the advantage of providing a better 'wedge' shape, and providing a larger gap size for the article 102 to fit through, when the fixing 100 is in the open configuration 100a. The kink may be positioned at any distance along the second portion 112. The first portion 110 may also comprise a kink. Either portion may comprise more than one kink, to achieve the desired friction effects.

Figure 3:
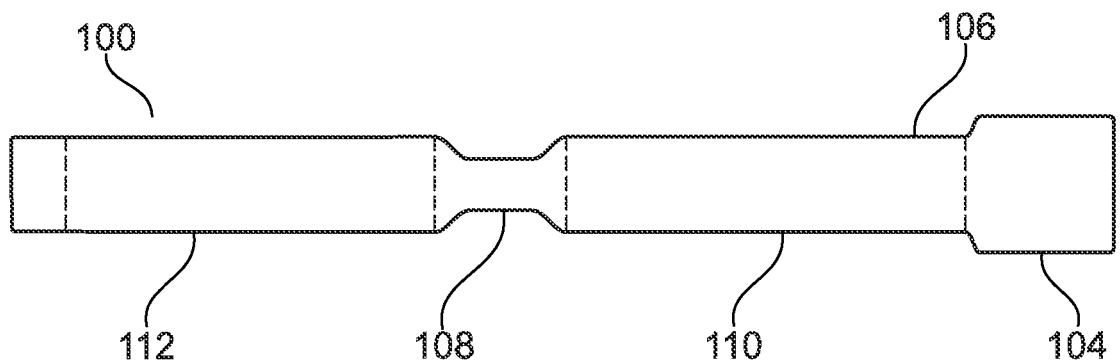
FIG. 3 is an embodiment of the present invention, showing a plan view of the fixing in FIGS. 1 and 2, wherein the fixing is laid out flat in a pre-bent form.

FIG. 3 shows an embodiment of the present invention, showing a plan view of the fixing 100 in FIGS. 1 and 2, wherein the fixing 100 is laid out flat in a pre-bent form. As seen in the figures the fixing may be pressed from a sheet of steel, resulting in a single elongate member. The sheet of steel may be around 0.1 mm-1 mm thick or about 0.4 mm thick.

The overall length of the fixing 100 may be around 10 mm-100 mm or about 30 mm. The coupling arrangement 104 may have a bend diameter of around 0.5 mm-5 mm or about 2 mm, to suit, for example, about a 0.5 mm-5 mm or about 2 mm diameter cable, or cylindrical article 102. It should be easily anticipated that the fixing 100 is scalable to suit other sized articles 102 and other sized holes. It should also be appreciated that the barbs 114 are merely exemplary, and that they can be of any shape or size.

Figure 4:
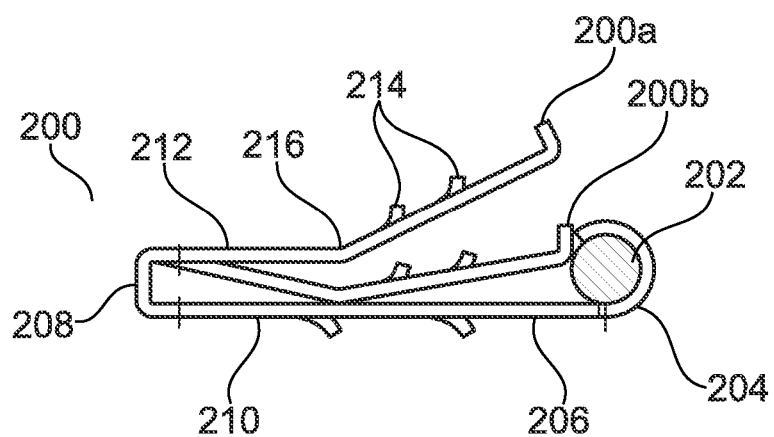
FIG. 4 is an embodiment of the present invention according to FIG. 1, with a modified and extended coupling arrangement.

FIG. 4 shows an embodiment of the present invention according to FIG. 1, with a modified and extended coupling arrangement 204. The fixing 200 is similar to the fixing shown in FIG. 1, however the coupling arrangement 204 extends further than the coupling arrangement in the embodiment of FIG. 1. This is shown in the top half of the generally circular coupling arrangement 204, extending past the vertical (in an anticlockwise orientation). This results in the coupling arrangement 204 engaging with the second portion 212 of the elongate member 206, when the fixing 200 is in the closed configuration 200b.

The coupling arrangement 204 may clip into the end of the second portion 212, thereby further securing the article 202 to the fixing 200. Although there is no clip mechanism shown, this should be easily envisaged by a skilled person. Any form of clip, fastener, clasp, catch, pin, hook, loop, coupler may be used to attached the coupling arrangement 204 to the end of the second portion 212. The fastening may be a releasable fastening.

The clip or fastener should therefore not be limited to any particular type of fastening, but merely should be construed as a form of fastener which engages the coupling arrangement 204 with the end of the second portion 212.

The fixing 200 shown in FIG. 4 may provide a more secure attachment of the article than the fixing shown in FIG. 1.

Figure 5:
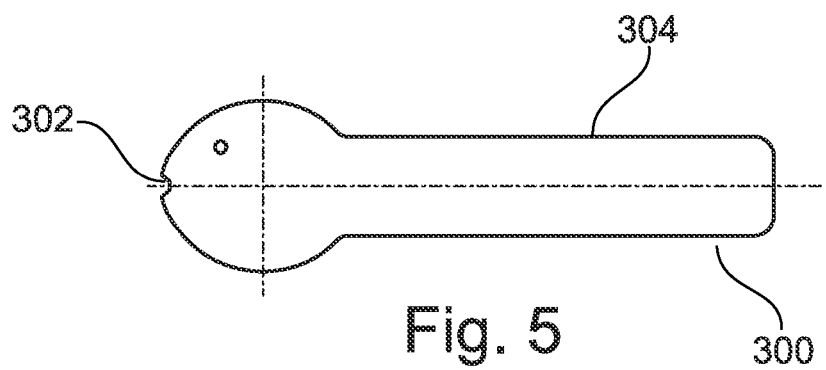
FIGS. 5 and 6 show an example embodiment of an insertion device according to the present invention, where
Figure 6:
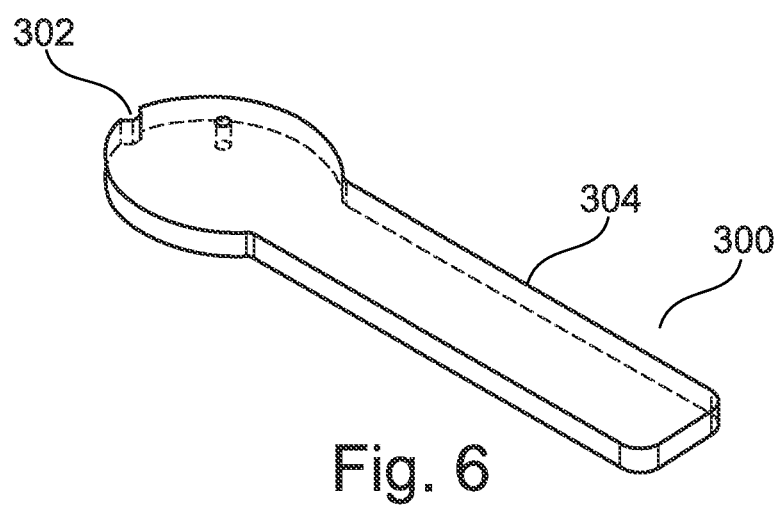

FIGS. 5 and 6 show an example embodiment of an insertion device 300 according to the present invention, where FIG. 5 is an elevation view, and FIG. 6 is a perspective view.

The insertion device 300 may comprise a handle 304, which the installer would use to hold the device. The device may also comprise a recess 302, which may be suitable for engaging with the fixing 100/200. The insertion device 300 may be used to aid insertion of the fixings 100/200 into a wall, after the hole has been drilled. The insertion device 300 may be particularly useful for inserting the fixings 100/200 where space is limited, and the user's fingers may be too large to access the fixing, for example in the corner of a room, or where the ceiling meets a wall.

The insertion device 300 may be sold with the fixings 100/200 as a kit of parts, and may be used in conjunction with the device.

Whilst specific embodiments of the present invention have been described above, it will be appreciated that departures from the described embodiments may still fall within the scope of the present invention.

The invention claimed is:

1. A fixing of unitary construction for securing an article to a surface, comprising;
a coupling arrangement, for coupling the article to the fixing; and
an elongate member extending from the coupling arrangement;
the elongate member comprising a bend which is located substantially midway along the length of the elongate member, the bend defining a first portion and second portion of the elongate member;
wherein the first and second portions are resiliently biased away from each other, and the first portion extends between the coupling arrangement and the bend, and the second portion extends towards the coupling arrangement from the bend, forming a gap suitable for the article, between the second portion and the coupling arrangement;
wherein the gap size is adjusted by varying the distance between the first and second portions of the elongate member; and
wherein the fixing comprises barbs which increase the friction between the fixing and a hole.

2. A fixing according to claim 1, wherein the article is a cable, and wherein the surface is a wall.

3. A fixing according claim 1, wherein the first and second portions of the elongate member generally diverge from each other as they extend from the bend.

4. A fixing according to claim 1, wherein in use, the fixing is fully inserted into a hole, thereby reducing the distance between the first and second portions of the elongate member, thus reducing the gap size and thus coupling the article to the fixing, and coupling the fixing to the hole.

5. A fixing according to claim 1, wherein the fixing is a single elongate member, which is formed from a pressed material.

6. A fixing according to claim 1, wherein the coupling arrangement at least partially encircles the article.

7. A fixing according to claim 1, wherein the second portion of the elongate member comprises a kink, which causes a length of the second portion to diverge away from the first portion.

8. A fixing according to claim 1, wherein the fixing is suitable for inserting into a hole which has a diameter of about 2 mm-4 mm.

9. A fixing according to claim 1, wherein the coupling arrangement is releasably engageable with the second portion of the elongate member.

10. A method of fixing an article to a surface, the method comprising the steps of:
creating a hole in the surface;
at least partially inserting a fixing according to claim 1 into the hole;
inserting the article through the gap, and into the coupling arrangement;
inserting the fixing into the hole, thereby causing the first and second portions of the elongate member to move towards one another, thus reducing the distance between them, thus reducing the gap size, thereby securely coupling the article to the fixing, and attaching the fixing to the surface.

11. A method according to claim 10, wherein the clamping force on the article within the coupling arrangement is proportional to how far the fixing is inserted into the hole.

12. A method according to claim 10, wherein the fixing is inserted into the hole orientated with the bend entering the hole first.

13. A method according to claim 10, wherein the article is a cable.

14. A method according to claim 10, wherein when the fixing is fully inserted into the hole, the coupling arrangement engages with the second portion of the elongate member.

15. A kit of parts, containing a fixing according to claim 1, and an insertion device comprising a handle, the insertion device being suitable for inserting the fixing into a hole.

16. A kit of parts according to claim 15, wherein the insertion device further comprises a recess, to engage with the fixing.

* * * * *